United States Patent
Cross et al.

(10) Patent No.: US 12,431,016 B2
(45) Date of Patent: *Sep. 30, 2025

(54) SYSTEMS AND METHODS FOR PACING A MASS TRANSIT VEHICLE

(71) Applicant: STC, Inc., McLeansboro, IL (US)

(72) Inventors: Brad Cross, McLeansboro, IL (US); Nick Freed, Thompsonville, IL (US)

(73) Assignee: STC, Inc., McLeansboro, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,075

(22) Filed: Dec. 11, 2023

(65) Prior Publication Data
US 2024/0112576 A1  Apr. 4, 2024

Related U.S. Application Data

(63) Continuation of application No. 17/509,708, filed on Oct. 25, 2021, now Pat. No. 11,842,636, which is a continuation of application No. 16/833,397, filed on Mar. 27, 2020, now Pat. No. 11,170,642.

(60) Provisional application No. 62/825,502, filed on Mar. 28, 2019.

(51) Int. Cl.
G08G 1/087 (2006.01)
G08G 1/082 (2006.01)
G08G 1/123 (2006.01)
H04W 4/42 (2018.01)

(52) U.S. Cl.
CPC ............. *G08G 1/087* (2013.01); *G08G 1/082* (2013.01); *G08G 1/123* (2013.01); *H04W 4/42* (2018.02)

(58) Field of Classification Search
CPC ........ G08G 1/087; G08G 1/082; G08G 1/123; H04W 4/42
USPC ....................................................... 340/906
See application file for complete search history.

(56) References Cited

U.S. PATENT DOCUMENTS 5,539,398 A   7/1996  Hall et al.
6,064,319 A   5/2000  Matta
6,292,746 B1*  9/2001  Oster ................. G01C 21/3446
                                                    701/19

(Continued)

FOREIGN PATENT DOCUMENTS

EP        2946982 A1    11/2015
JP      2016115247 A     6/2016
KR    1020160029581 A    3/2016

OTHER PUBLICATIONS

International Search Report and Written Opinion in PCT/US2020/025358, mailed Jul. 23, 2020, 12 pages.

(Continued)

*Primary Examiner* — Brian A Zimmerman
*Assistant Examiner* — Thang D Tran
(74) *Attorney, Agent, or Firm* — Lewis Rice LLC

(57) ABSTRACT

Systems and methods that allow use of simple priority VCUs (those that can only request an increased priority) to operate in a manner that simulates much more sophisticated schedule-adherence or ETA-type traffic control systems without the need to upgrade vehicle hardware. Instead, tracking of the vehicle, whether provided by other systems or by the VCU operating in conjunction with certain prepared points or zones is used to determine if the VCU equipped vehicle is ahead or behind schedule and operation of the VCU itself is altered to modify the expected arrival time of the vehicle.

11 Claims, 5 Drawing Sheets

(56) References Cited

U.S. PATENT DOCUMENTS

| | | | |
|---|---|---|---|
| 6,737,978 B1 | 5/2004 | Bartek | |
| 7,515,064 B2 | 4/2009 | Schwartz | |
| 7,624,952 B1 | 12/2009 | Bartek | |
| 8,061,662 B1 | 11/2011 | Bartek | |
| 9,776,648 B2 | 10/2017 | Benjamin et al. | |
| 9,902,411 B2 | 2/2018 | Bartek et al. | |
| 10,382,889 B1 | 8/2019 | Ajmeri et al. | |
| 10,435,053 B2* | 10/2019 | Bresson | B61L 3/225 |
| 2002/0069017 A1 | 6/2002 | Schmier et al. | |
| 2003/0146854 A1 | 8/2003 | Jones | |
| 2004/0147291 A1* | 7/2004 | Zhang | G08G 1/087 |
| | | | 455/344 |
| 2005/0104745 A1 | 5/2005 | Bachelder et al. | |
| 2005/0128103 A1 | 6/2005 | Bachelder | |
| 2005/0216147 A1 | 9/2005 | Ferman | |
| 2006/0292984 A1 | 12/2006 | Teate et al. | |
| 2007/0008173 A1 | 1/2007 | Schwartz | |
| 2007/0008174 A1 | 1/2007 | Schwartz | |
| 2007/0173991 A1 | 7/2007 | Tenzer et al. | |
| 2008/0002635 A1 | 1/2008 | Mosko et al. | |
| 2008/0012726 A1 | 1/2008 | Publicover | |
| 2009/0160604 A1 | 6/2009 | Nguyen | |
| 2009/0189782 A1 | 7/2009 | Bachelder | |
| 2011/0127389 A1 | 6/2011 | Bartek | |
| 2012/0326890 A1* | 12/2012 | Cross | G08G 1/087 |
| | | | 340/906 |
| 2012/0326891 A1* | 12/2012 | Cross | G08G 1/087 |
| | | | 340/906 |
| 2013/0013179 A1* | 1/2013 | Lection | G08G 1/0145 |
| | | | 701/117 |
| 2013/0041941 A1 | 2/2013 | Tomasic et al. | |
| 2013/0048795 A1* | 2/2013 | Cross | B61L 15/0027 |
| | | | 246/122 R |
| 2014/0104081 A1 | 4/2014 | Cross et al. | |
| 2014/0125498 A1 | 5/2014 | Curry et al. | |
| 2014/0247159 A1* | 9/2014 | Cross | G08G 1/082 |
| | | | 340/906 |
| 2015/0127249 A1* | 5/2015 | Strau | G08G 1/0112 |
| | | | 701/439 |
| 2015/0232110 A1 | 8/2015 | Ghaly | |
| 2015/0243165 A1 | 8/2015 | Elsheemy | |
| 2015/0268052 A1* | 9/2015 | Berczi | G01C 21/343 |
| | | | 701/408 |
| 2015/0332589 A1* | 11/2015 | Eichhorst | G08G 1/087 |
| | | | 340/906 |
| 2016/0046290 A1 | 2/2016 | Aharony et al. | |
| 2016/0096538 A1 | 4/2016 | Bartek et al. | |
| 2016/0163193 A1* | 6/2016 | Cross | G08G 1/082 |
| | | | 340/907 |
| 2016/0189552 A1* | 6/2016 | Hilleary | B61L 29/22 |
| | | | 246/125 |
| 2016/0275789 A1 | 9/2016 | Pencheon | |
| 2016/0328969 A1 | 11/2016 | Baller | |
| 2017/0015336 A1 | 1/2017 | Bartek | |
| 2017/0025003 A1 | 1/2017 | Arpin et al. | |
| 2017/0059341 A1 | 3/2017 | Vo et al. | |
| 2017/0106863 A1 | 4/2017 | Morissette | |
| 2017/0132915 A1 | 5/2017 | Cross et al. | |
| 2017/0169373 A1 | 6/2017 | Roulland et al. | |
| 2017/0265040 A1* | 9/2017 | Friedlander | H04W 4/029 |
| 2017/0336224 A1* | 11/2017 | Kim | G06Q 10/02 |
| 2018/0017970 A1 | 1/2018 | Kim et al. | |
| 2018/0096603 A1 | 4/2018 | Mushynski et al. | |
| 2018/0170349 A1* | 6/2018 | Jobson | B60L 7/18 |
| 2018/0204451 A1 | 7/2018 | Cross et al. | |
| 2018/0286228 A1 | 10/2018 | Xu et al. | |
| 2018/0322431 A1 | 11/2018 | Folck | |
| 2018/0374348 A1 | 12/2018 | Kan et al. | |
| 2019/0088120 A1 | 3/2019 | Adireddy et al. | |
| 2019/0132703 A1 | 5/2019 | Ramasamy | |
| 2019/0135317 A1* | 5/2019 | Hilleary | G01S 13/62 |
| 2020/0005644 A1 | 1/2020 | Ichimaru et al. | |

OTHER PUBLICATIONS

Portable Train Detector Kit, Roadway Worker Protection System, Protran Technology, A Harsco Rail Company, 2017, 2 pages.

ZoneGuard, A Revolutionary Roadway Worker Protection System, Miller Ingenuity, 2018 [retrieved on Oct. 22, 2018]. Retrieved from the Internet: <URL:https://www.milleringenuity.com/Products/Roadway-Worker-Protection>, 6 pages.

* cited by examiner

SYSTEMS AND METHODS FOR PACING A MASS TRANSIT VEHICLE

CROSS-REFERENCE TO RELATED APPLICATIONS

This application is a Continuation of U.S. patent application Ser. No. 17/509,708, filed Oct. 25, 2021, which is a Continuation of U.S. patent application Ser. No. 16/833,397, filed Mar. 27, 2020, now issued as U.S. Pat. No. 11,170,642, which claims the benefit of U.S. Provisional Patent Application No. 62/825,502, filed Mar. 28, 2019. The entire disclosure of all the above documents is incorporated herein by reference.

BACKGROUND OF THE INVENTION

Field of the Invention

This disclosure is related to the field of systems for the management of mass transit vehicles or other vehicles which adhere to published or rigid schedules and routes.

Description of the Related Art

In the perfect commuter utopia, signal lights would automatically switch to green every time a driver's vehicle approached an intersection, creating an unobstructed pathway towards the driver's final destination. In real life though, hitting a red light is a normal and inevitable part of any driver's commute. With the growth of modern cities and the reliance of much of the population on mass transit and personal automobiles for transportation, efficient control of the ebb and flow of traffic through efficient and smart signal light control and coordination systems has become increasingly important.

There are many substantial benefits to be reaped from improved traffic flow for personal, mass transit, and emergency motor vehicles. For many commuters, reclaiming part of their day would enhance their quality of life. Further, less congestion on the roads would generate fewer accidents, thereby saving lives. Moreover, traffic delays impinge on productivity and economic efficiency. Time spent traveling to and from work is not time spent doing work. Further, many goods must be transported and many service providers must travel to their clients. Traffic delays all of these economic production factors.

There is also a concern regarding the increased pollution that results from stop-and-go traffic flow in contrast to smooth flowing traffic. Further, longer commutes means longer running times and entails more greenhouse gases. Also, congested traffic and uncoordinated signal lights can cause delays in the mass transit system which, if not remedied, can throw off an entire mass transit schedule grid and disincentivise individuals from using mass transit systems. For example, it has been demonstrated that schedule adherence for mass transit vehicles results in an increase in ridership. Lastly, the importance of prioritizing and efficiently moving emergency vehicles through traffic lights is axiomatic.

Currently, a variety of different control and coordination systems are utilized to ensure the smooth and safe management of traffic flows. One commonly utilized mechanism is the traffic controller system. In this system, the timing of a particular signal light is controlled by a traffic controller located inside a cabinet that is typically at a close proximity to the signal light. Generally, the traffic controller cabinet contains a power panel (to distribute electrical power in the cabinet); a detector interface panel (to connect to loop detectors and other detectors); detector amplifiers; a controller; a conflict motor unit; flash transfer relays; and a police panel (to allow the police to disable and control the signal), amongst other components.

Traffic controller cabinets generally operate on the concept of phases or directions of movement grouped together. For example, a simple four-way intersection will have two phases: North/South and East/West; a four-way intersection with independent control for each direction and each left hand turn will have eight phases. Controllers also generally operate on the concept of rings or different arrays of independent timing sequences. For example, in a dual ring controller, opposing left-turn arrows may turn red independently, depending on the amount of traffic. Thus, a typical controller is an eight-phase, dual ring controller.

The currently utilized control and coordination systems for the typical signal light range from simple clocked timing mechanisms to sophisticated computerized control and coordination systems that self-adjust to minimize the delay to individuals utilizing the roadways.

The simplest control system currently utilized is a timer system. In this system, each phase lasts for a specific duration until the next phase change occurs. Generally, this specific timed pattern will repeat itself regardless of the current traffic flows or the location of a priority vehicle within the traffic grid. While this type of control mechanism can be effective in one-way grids where it is often possible to coordinate signal lights to the posted speed limit, this control mechanism is not advantageous when the signal timing of the intersection would benefit from being adapted to the changing flows of traffic throughout the day.

Dynamic signals, also known as actuated signals, are programmed to adjust their timing and phasing to meet the changing ebb and flow in traffic patterns throughout the day. Generally, dynamic traffic control systems use input from detectors to adjust signal timing and phasing. Detectors are devices that use sensors to inform the controller processor whether vehicles or other road users are present. The signal control mechanism at a given light can utilize the input it receives from the detectors to adequately adjust the length and timing of the phases in accordance with the current traffic volumes and flows. The currently utilized detectors can generally be placed into three main classes: in-pavement detectors, non-intrusive detectors, and detectors for non-motorized road users.

In-pavement detectors are detectors that are located in or underneath the roadway. These detectors typically function similarly to metal detectors or weight detectors, utilizing the metal content or the weight of a vehicle as a trigger to detect the presence of traffic waiting at the light and, thus, can reduce the time period that a green signal is given to an empty road and increase the time period that a green signal is given to a busy throughway during rush hour. Non-intrusive detectors include video image processors, sensors that use electromagnetic waves or acoustic sensors that detect the presence of vehicles at the intersection waiting for the right of way from a location generally over the roadway. Some models of these non-intrusive detectors have the benefit of being able to sense the presence of vehicles or traffic in a general area or virtual detection zone preceding the intersection. Vehicle detection in these zones can have an impact on the timing of the phases. Finally, non-motorized user detectors include demand buttons and specifically tuned detectors for detecting pedestrians, bicyclists and equestrians.

While all the above systems are effective for better routing traffic, they all have a problem of treating all vehicles the same. Recently, Traffic Signal Processing (TSP) systems have started to come to the forefront of traffic control. These systems allow for certain vehicles to get priority through an intersection while others do not and therefore allow for granularity within a traffic flow for priority. Commonly, the specific vehicle is identified by it having an onboard system or a Vehicle Control Unit (VCU) which transmits to the TSP that the vehicle is in need of priority through the intersection. Thus, an emergency vehicle, for example, can be provided with green lights at all intersections it approaches to facilitate its movement through traffic. Also, because opposing lights are red, other traffic essentially automatically yields to the emergency vehicle and there is no need for traffic to have to specifically yield for the emergency vehicle, which can snarl traffic.

VCUs such as these can also be used, and have been used, to assist with the movement of mass transit vehicles through traffic and to help them to stay on schedule. Because mass transit vehicles often move through congested streets when congestion is often at its worst, they commonly fall behind schedule due to getting stuck in traffic. For those that rely on mass transit, this can be a problem and can result in rider complaints and even them substituting away form mass transit as they cannot rely on it to get them where they need to be on time.

While these types of basic VCUs can be very beneficial for mass transit vehicles or other vehicles which need to be able to meet a proscribed schedule, they also present some problems Namely, priority vehicles in these systems are generally only able to interact with a traffic signal at an immediately forthcoming intersection along the vehicle's current route; there is no real-time monitoring of the traffic flows preceding or following this intersection or across a grid of multiple signal lights. Stated differently, there is no real-time monitoring of how a vehicle travels through a traffic grid as a whole (i.e., approaching, traveling through and leaving intersections along with a vehicle's transit between intersections). Accordingly, these systems work well for priority vehicles such as an emergency vehicles which need to be accelerated through all traffic signals at the expense of all other vehicles. However, they lack the capability to adapt and adjust to traffic flows to keep a mass transit vehicle, or similar time-scheduled vehicle, on time.

To put this another way, these systems only have the capability for control of a particular signal light to accelerate the movement of a vehicle approaching that signal directly (giving it priority). This is fine for a mass transit vehicle that is behind schedule, but for one which is on time or ahead of schedule, it actually can result in the mass transit vehicle moving further from the targeted schedule adherence, not closer to it.

While many people think the biggest concern for mass transit vehicles is them arriving late, this is actually often not true as a transit vehicle that consistently arrives early often creates a much bigger problem as its riders have to guess at its arrival time, or risk missing it. One response is often that the mass transit vehicle can simply spend extra time at a stop to purposefully slow its movement which resolves the problem. While this can work, it is often the case that the operator does not realize the precise amount of time it may be ahead of schedule or even that it is ahead of schedule. Further, many mass transit vehicles (particularly buses) operate within the flow of other traffic, so a stopped bus wafting in a traffic lane for an extra five minutes can present a dangerous obstruction to other traffic which needs to go around it.

Another frequent traffic problem caused by mass transit vehicles arriving early is mass transit vehicle bunching, also known as bus bunching, clumping or platooning. Bunching refers to a group of two or more transit vehicles along the same route, which are scheduled to be evenly spaced, such as buses, catching up with each other and, thus, running in the same location at the same time. Generally, bunching occurs when at least one of the vehicles is unable to keep to its schedule (falls behind) and therefore ends up in the same location as a following vehicle on the same route.

This occurs because the lead mass transit vehicle in the bunch (which is already running late) typically slows to pick up passengers that would otherwise have missed that vehicle and caught the trailing mass transit vehicle. Added unplanned passengers leads to overcrowding and further slowing of the lead vehicle as it takes longer than expected to load. Conversely, the trailing mass transit vehicle encounters fewer passengers (as many of its normal passengers are actually catching the lead vehicle) meaning it travels the route faster. Soon, both mass transit vehicles are in full view of each other leading to, at least, the dismay of passengers on the overcrowded and behind schedule vehicle.

It is no surprise that bunching is a leading complaint of regular transit riders and a headache for those operating and managing transit services. The currently systems—with their control methodology localized to individual lights—are simply incapable of controlling or preventing bunching as while thy can provide some acceleration to the lead vehicle through intersections, they cannot slow the trailing vehicle or assist the lead vehicle in dealing with the increased passenger load.

Another failing of the currently utilized detection zone based systems is their inability to modify the conditions under which a vehicle may request priority. For example, under many of these currently utilized systems, priority is given to any flagged vehicle that is sensed as approaching. Effectively, if the vehicle has an operating VCU, the vehicle is granted priority at all intersections it approaches (assuming they are equipped with TSP systems). These systems are, thus, generally incapable of granting priority on a more nuanced and conditional basis as they are effectively on/off systems. This makes sense for emergency vehicles as they typically always require priority when responding to an emergency situation, but makes the VCU, at best, a crude tool for schedule adherence.

To deal with these problems, systems for maintaining a vehicle to a schedule have been provided which provide for more sophistication allowing vehicles to be both accelerated or slowed depending on their current position and timing within their published schedule. These systems come in the form of schedule-adherence systems where the VCU is capable of transmitting its schedule adherence status to the TSP when it enters a zone approaching an intersection. The TSP can then determine if priority is required. Even more sophisticated estimated time of arrival ("ETA") systems, such systems are discussed in, for example, U.S. Pat. Nos. 8,773,282; 8,878,695; 9,330,566; and 9,916,759 the entire disclosures of which are herein incorporated by reference, allow for such transmission to multiple intersections to provide for improved future schedule adherence.

These types of systems can provide for dramatically improved flow of vehicles attempting to adhere to predetermined schedules. However, they require a substantial amount of additional installed equipment over simple priority systems. Specifically, the vehicle needs to be provided with an onboard computer and/or communication system to communicate its schedule adherence with the TSP at the intersection to both obtain priority when it should be given and to be granted reduced priority (or simply no priority) when it is not. Alternatively, this operation can be off-loaded on central servers, but again, the system needs to be able to provide both advanced signals to the TSP and have the TSP be able to understand signals to both accelerate and decelerate traffic coming from a particular direction to keep the mass transit vehicle on schedule.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

The present disclosure provides for systems that allow use of simple priority VCUs (those that can only request an increased priority) to operate in a manner that simulates much more sophisticated schedule-adherence or ETA-type traffic control systems without the need to upgrade vehicle hardware. Instead, tracking of the vehicle, whether provided by other systems or by the VCU operating in conjunction with certain prepared points or zones is used to determine if the VCU equipped vehicle is ahead or behind schedule and operation of the VCU itself is altered to modify the expected arrival time of the vehicle.

Systems and methods are also discussed herein, among other things, for providing schedule adherence conditional TSP without requiring integration of the VCU with a traditional on-board bus computer providing on-schedule status notification. These systems and methods provide transit system designers with the potential of significant hardware and software cost savings while enhancing system reliability and maintainability.

Because of these and other problems in the art, described herein, among other things, is a system for assisting in maintaining a vehicle on a fixed schedule, the system comprising; a vehicle having its own schedule with a specified scheduled arrival time at each of a plurality of specified destinations along a route; a plurality of priority detector units, wherein each priority detector unit is communicatively attached to a signal light controller along said route; and a vehicle control unit (VCU) in said vehicle, said VCU configured to interface with said plurality of priority detectors, said VCU; wherein, an amount of time measured for said vehicle to traverse a portion of said route determines if said VCU is active and requests priority for said vehicle from a next priority detector unit on said route, or is inactive and does not request priority for said vehicle from said next priority detector unit on said route.

In an embodiment of the system, the portion of said route corresponds to a corridor timing zone.

In an embodiment of the system, the corridor timing zone is positioned along said route prior to a zone for activating said next priority detector.

In an embodiment of the system, the corridor timing zone is positioned along said route at least partially overlapping a zone for activating said next priority detector.

In an embodiment of the system, the portion of said route corresponds to a portion between two waypoints.

In an embodiment of the system, the waypoints correspond to scheduling stopping points for said vehicle.

In an embodiment of the system, the vehicle is a mass transit vehicle such as, but not limited to, a bus.

In an embodiment, the system further comprises an authorization disable zone which inactivates said VCU when said vehicle enters said authorization disable zone regardless of if said VCU is active or inactive when said vehicle enters said authorization disable zone.

In different embodiments of the system, the authorization disable zone may or may not be on said route.

In an embodiment, the system further comprises an authorization enable zone which activates said VCU when said vehicle enters said authorization enable zone regardless of if said VCU is active or inactive when said vehicle enters said authorization enable zone.

In different embodiments of the system, the authorization enable zone may or may not be on said route.

There is also described herein, in an embodiment, a system for assisting in maintaining a vehicle on a fixed schedule, the system comprising; a vehicle having its own schedule with a specified scheduled arrival time at each of a plurality of specified destinations along a route; a plurality of priority detector units, wherein each priority detector unit is communicatively attached to a signal light controller along said route; and a vehicle control unit (VCU) in said vehicle, said VCU configured to interface with said plurality of priority detectors, said VCU; wherein, a target time for said vehicle to arrive at a point on said route is compared to an actual time said vehicles arrives art said point and said comparison determines if said VCU is active and requests priority for said vehicle from a next priority detector unit on said route, or is inactive and does not request priority for said vehicle from said next priority detector unit on said route.

In an embodiment of the system, the target time and said point on said route are determined from General Transit Feed Specification (GTFS) information.

In an embodiment of the system, the target time and said point on said route comprises a scheduled stop of said vehicle.

In an embodiment of the system, the vehicle is a mass transit vehicle such as, but not limited to, a bus.

In an embodiment, the system further comprises an authorization disable zone which inactivates said VCU when said vehicle enters said authorization disable zone regardless of if said VCU is active or inactive when said vehicle enters said authorization disable zone.

In different embodiments of the system, the authorization disable zone may or may not be on said route.

In an embodiment, the system further comprises an authorization enable zone which activates said VCU when said vehicle enters said authorization enable zone regardless of if said VCU is active or inactive when said vehicle enters said authorization enable zone.

In different embodiments of the system, the authorization disable zone may or may not be on said route.

DESCRIPTION OF THE PREFERRED EMBODIMENT(S)

Figure 1:
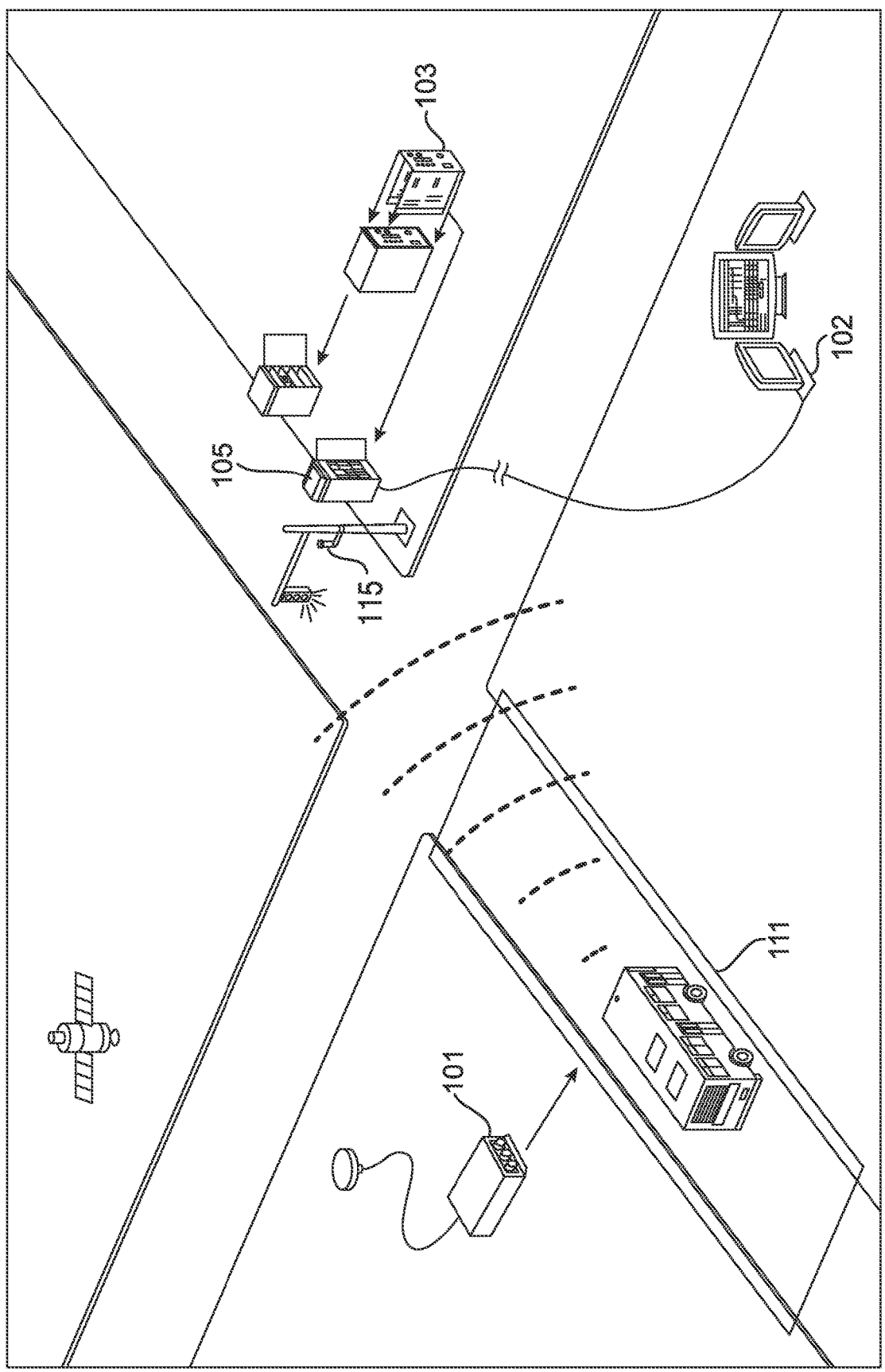
FIG. 1 provides a diagram of a traffic control system.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

As a preliminary matter, it should be noted that while the description of various embodiments of the disclosed system will discuss the movement of mass transit vehicles (such as, but not limited to, buses, light rail trains, and street cars) and particularly buses through signal lights as buses typically operate within the flow of vehicle traffic, this in no way limits the application of the disclosed traffic control system to use in mass transit systems. Any vehicle which could benefit from a traffic control system which helps it maintain a preset schedule along a preset route as described herein is contemplated. For example, it is contemplated that the system could be applied to and utilized by snow plows and waste management vehicles.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, mini-computers, mainframe computers, video game consoles, handheld video game products, and wearable computing devices including, but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include, but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters. Those of ordinary skill in the art recognize that software can be wired or embedded into hardware, including, without limitation, onto a microchip, and still be considered "software" within the meaning of this disclosure. For purposes of this disclosure, software includes, without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "mobile device". A mobile communication device may be, but is not limited to, a smart phone, tablet PC, e-reader, satellite navigation system ("SatNav"), fitness device (e.g. a Fitbit™ or Jawbone™) or any other type of mobile computer, whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network.

The system utilizes a "positioning system" which is any form of location technology and will typically be a satellite positioning system such as GPS, GLONASS, or similar technology, but may also include inertial and other positioning systems, and wireless communication to enable transit vehicles to report location and activity data to traffic controllers and/or central locations in real time. Further, the system typically enables dispatchers or other monitoring personnel at a centralized or secondary remote location to see the location of key vehicles in and/or personnel traffic grid. The system can also allow for the generation and sending of automatic or manual alerts to notify vehicle operators of changes in route status. However, any wireless methodology for transferring the location data created by the VCU (101) to the other component parts of the system to which it is communicatively networked is contemplated. Thus, contemplated wireless technologies include, but are not limited to, telemetry control, radio frequency communication, microwave communication, GPS and infrared short-range communication.

The traffic control system described herein is, in some embodiments, an improvement upon systems described in U.S. Pat. Nos. 8,878,695, 8,773,282, 9,330,566 and 9,916,759. The entire disclosure of all of these documents is incorporated herein by reference.

For purposes of background, the traffic control system described herein is generally structured as follows an embodiment of which is shown in FIG. 1. In its basic form, the hardware components of the system include a vehicle equipment unit/vehicle computer unit (VCU) (101) installed in vehicles and a priority detector (103) installed in or near signal control cabinets (105) (along with a cabinet- or pole-mounted antenna). The signal control cabinets (105) may be independent (each controls only a single intersection) or may communicate with a central control center (102) to provide for more integrated control over a certain grid area.

As will be described further herein, the basic hardware components of the system (generally the VCU (101) and the priority detector (103)) generally communicate wirelessly using secure frequency hopping spread spectrum radio. The mobile-vehicle mounted hardware components, such as the VCU (101), typically utilize GPS or other known positioning technology to determine the precise real-time location of the VCU (101) and the vehicle to which it is attached at all times.

The VCU (101) is typically installed in a monitored vehicle in the traffic grid. As noted previously, contemplated monitored vehicles include, but are not limited to, mass transit vehicles (buses, trains, light rail, etc.), emergency vehicles (fire trucks, police cars, ambulances, etc.), waste management vehicles, and road maintenance vehicles. It should be understood that the system disclosed herein contemplates the installation of one or more VCUs (101) in various vehicles traveling and operating in the traffic grid.

Generally, the VCU (101) serves several functions in the disclosed traffic control system. The VCU (101) determines the real-time location data for the vehicle in which it is installed. This data includes the vehicle's velocity and coordinates. However, as contemplated herein, the VCU (101) lacks the capability of calculating and determining whether or not the vehicle is on schedule. This will also mean that the priority detector (103) cannot make priority decisions based on schedule adherence information. Instead, the VCU (101) effectively only operates as a toggle switch. If the VCU (101) is operating (enabled), it will always request priority at the next intersection. If it is not operating (disabled) it will never request priority at the next intersection. This is often standard operation for a VCU (101) designed for use in an emergency vehicle.

One contemplated component part of the VCU (101) is a receiver for a satellite positioning system. Generally, any satellite positioning system known to one of ordinary skill in the art is contemplated. Further, any receiver technology known to those of skill in the art that is able to calculate its real-time position by precisely timing the signals sent by satellites, or by any other methodology known to those of ordinary skill in the art, is a contemplated receiver in the disclosed system. Typically the receiver will be selected based on the specific satellite positioning system the VCU (110) is using. In alternative embodiments, other positioning systems may additionally or alternatively be included.

The installation of the receiver can be either permanent, by direct integration into the vehicle, or temporary, through a mobile receiver that can be taken into and removed from the vehicle. Generally, the receiver of the VCU (101) functions to determine the vehicle's position, direction and velocity in real-time at any given point during its travels. In alternative embodiments, it is contemplated that the VCU (101) will determine its position, direction and velocity through internal navigation systems known to those of ordinary skill in the art alternatively, or in addition to, satellite positioning driven systems. Contemplated internal navigation systems include, but are not limited to, gyroscopic instruments, wheel rotation devices, accelerometers, and radio navigation systems.

Another contemplated component of the VCU (101) is a radio transceiver. Generally, any device for the transmission and receiving of radio signals including but not limited to the FHSS and/or FH-CDMA methods of transmitting radio signals is contemplated.

The functionality of the computer of the VCU (101) may be at a single computer, or may be a network whereby the functions are distributed. Further, generally any wireless methodology for transferring the location data created by the VCU (101) to the other component parts of the system to which it is communicatively networked is contemplated. Thus, contemplated wireless technologies include, but are not limited to, telemetry control, radio frequency communication, microwave communication, GPS and infrared short-range communication.

Another component of the VCU (101), in certain embodiments, is a combination GPS/UHF antenna. In the embodiment with the combination antenna, the combo GPS/UHF antenna contains the antennas for both the transceiver and the GPS unit. Notably, however, this combo antenna is not required and in other embodiments two separate antennas or other communication devices can be utilized. Generally, the combo antenna or separate antennas will be mounted on the top of the priority vehicle, although this location is not determinative. Further, in certain embodiments, the antenna will be connected to the VCU (101) by two coax cable connections (one for UHF and one for GPS), although any method for connecting the antenna(s) to the VCU (101) (including both wired and wireless technologies) is contemplated.

In one embodiment, the VCU (101) will be powered directly by the vehicle battery. For example, in one contemplated embodiment, the VCU (101) will be powered directly by 12 VDC from the vehicle battery. In other embodiments, the VCU (101) will be powered by a portable power unit known to those of skill in the art including, but not limited to, batteries and solar panels.

A second component of the traffic control system described herein is a plurality of priority detector units (103). The priority detector units (103) of the disclosed traffic control system generally function to modify and control the associated signal light based upon if the VCU (101) is requesting priority or not. The priority detector units (103) will generally be located at or near particular traffic light signals and signal controllers (105) in the area controlled by the disclosed system. In one embodiment, each priority detector unit (103) will be co-located within a particular signal light controller (105) cabinet. However, this location is not determinative. It is contemplated that the priority detector unit (103) may be located at any proximity near a particular signal light that allows the priority detector unit (103) to receive applicable signals from the remote traffic control center (102), secondary control centers (106), other priority detector units (103) and/or the VCUs (101) and allows the priority detector (103) to send calls to the signal controller (105) to modify the phases of the respective signal light that it monitors.

One component of the priority detector units (103) is the intersection antenna (115). This antenna (115) may be any antenna known to those of skill in the art that is capable of receiving radio or other electromagnetic signals. In one embodiment, the antenna will be co-located with the priority detector (103). In other embodiments, the antenna will be located at a position removed from the priority detector (103). Generally, it is contemplated that the intersection antenna (115) may be located at any place near the applicable intersection that would allow for the effective transmission and receipt of signals. For example, in certain embodiments it is contemplated that the intersection antenna (115) will be externally mounted on a signal light pole at the intersection. In one embodiment, the intersection antenna (115) will be connected to the priority detector unit (103) by wire connections, in one embodiment by two coax cable connections (e.g., for UHF and GPS). In another embodiment, the intersection antenna (115) will be connected wirelessly to the priority detector unit (103) in a manner known to those of ordinary skill in the art.

Further, different embodiments of the priority detector unit (103) include a shelf-mount version or a rack-mount version. In one embodiment of the rack-mount version, is it contemplated that the priority detector unit (103) will be able to be inserted directly into two adjoining card slots of a NEMA detector rack or Model 170 card file. However, it should be noted that any priority detector unit (103) design known to one of ordinary skill in the art that is able to perform the functionality described in this application is contemplated.

The priority detector unit (103) will generally send a variety of outputs using the standard North, South, East and West discreet outputs for a signal controller (105) based on information regarding a vehicle's geographical zone position or, effectively, from which direction it is approaching the intersection.

In one embodiment, the priority detector unit (103) will control multiple geographical or virtual zones (301) for a single light. For example, it may have a different zone pertaining to a light rail track, an in-street bus line, and a standard road signal even though all the various zones partially or totally overlap in a geographic sense. Generally, this standard output sent by the priority detector unit (103) (e.g., turn the North-bound light green) will be held until the vehicle leaves the detection zone (111). The priority detector units (103), in certain embodiments, generally will use auxiliary outputs (e.g., AUX1, AUX2, and AUX3) to communicate this standard output to the signal controller (105). However, any mode known to those of ordinary skill in the art for communicating the output signals from the priority detector unit (103) to the signal controller (105) is contemplated in this application.

Another component of the traffic control system also generally located in the traffic control cabinet (105) in certain embodiments is a high-speed data adapter. The high speed adaptor assists in the communication of output signals between the priority detector (103) and the signal controller (105). While any high-speed adapter known to one of ordinary skill in the art is contemplated, in one embodiment it is contemplated that the adaptor can use RS232, SDLC, Ethernet or other protocols to receive and output the large number of signals from the priority detector (103) to the signal controller (105).

Generally, the priority detector unit (103) of the traffic control system contemplated herein will only send a very limited number of output calls to the signal controller (105) with which it is associated. Specifically, the priority detector unit (103) will be able to give all traffic arriving from a certain direction (is within a specified zone (111)) priority to allow a priority vehicle approaching therewith to have priority, but will generally be incapable of making a decision to decline priority and the VCU (101) will also generally be incapable of indicating that it should be declined priority or that a prior priority request should be cancelled.

In order for the VCU (101) to simulate schedule-adherence or even ETA, there are a couple of different systems and methods which may be used, the first is by providing schedule adherence using a timing zone, a waypoint zone, or any combination of these to provide for route segment pacing. The second provides for schedule Adherence using General Traffic Feed Specification (GTFS) or other public facing route and stop information.

Route segment pacing is provided utilizing special detection zones which enable a mass transit vehicle with a VCU (101) which does not have schedule adherence or ETA information to selectively enable or disable VCU (101) operation based on the perceived needs of the system itself based on the vehicle's operation within a certain zone where the pace of the vehicle is monitored. This is accomplished through two different schemes of timing monitoring, which utilizes the real-time position of the vehicle in comparison with historical understanding of the transit-time between positions along the predetermined transit route.

These monitoring zones come in two general types. The first is a corridor timing zone which is a geographically designated zone typically placed between intersections or across multiple intersection approaches that is usually not directly associated with the detection zone for changing the traffic signal but will often overlap it at least in part. The corridor timing zone allows the input of a parameter which specifies the time limit, in seconds, in which the vehicle is "allowed" within the approach before it has taken "too long" to get from the start to the finish (indicating that traffic is impeding the progress of the transit vehicle and it is falling behind schedule). This parameter may be entered manually by the mass transit operator or may be recorded previously on the VCU (101) based on known or expected traffic patterns and traffic behavior within the corridor timing zone.

When the vehicle is within the corridor timing zone for longer than this parameter, the vehicle VCU (101), which will generally not be active prior to this time, will be enabled and, thus, the vehicle will begin to request transit signal priority from the next intersection as soon as it is in the detection zone of that intersection. This can allow the vehicle to utilize the VCU (101) to clear a particularly problematic knot of traffic in front of it that may be holding it at an intersection. In an extreme example, the system can actually allow for the VCU (101) to break out of "gridlock" due to current traffic flow.

Figure 2:
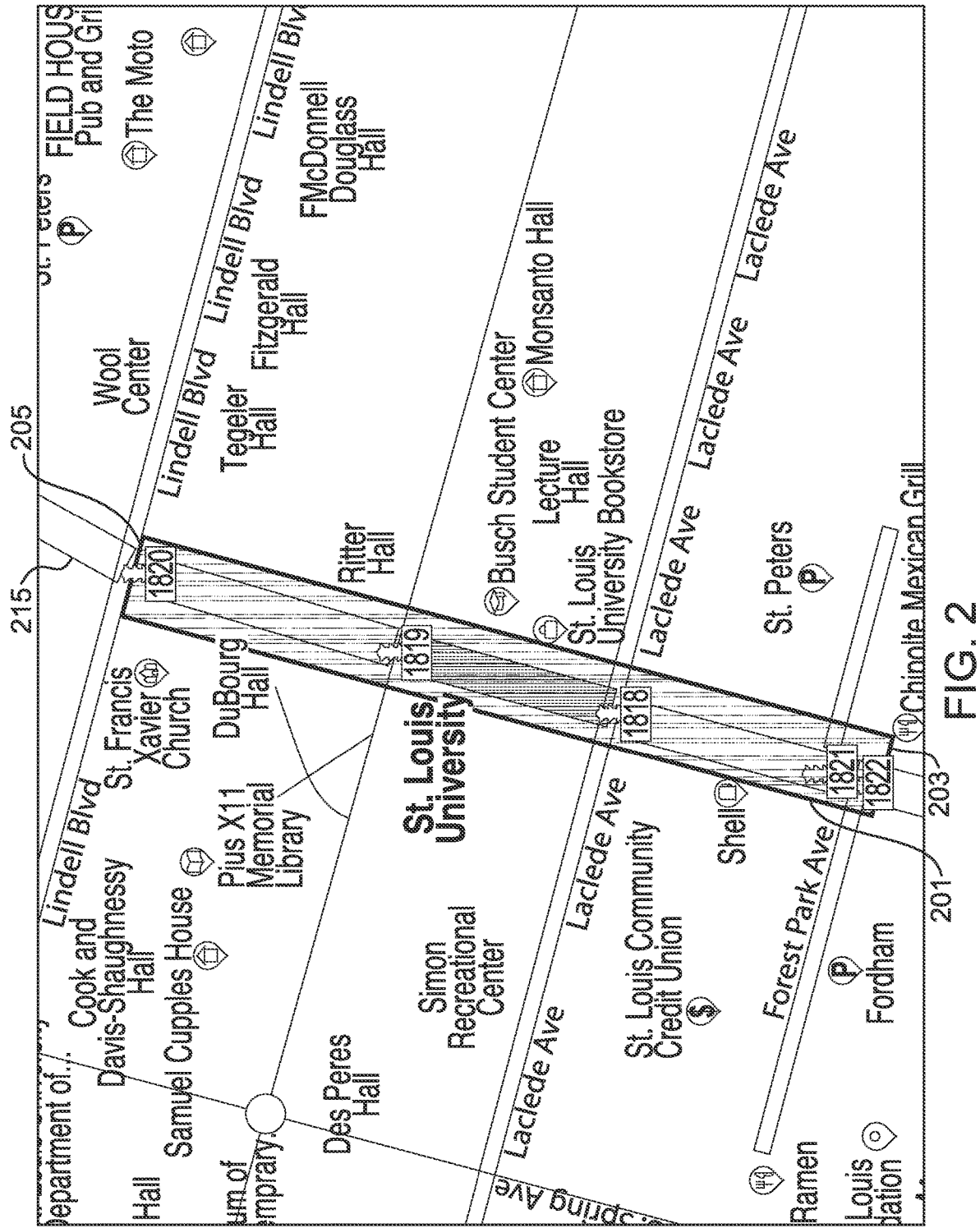
FIG. 2 provides a diagram of an embodiment of a corridor timing or "pacing" zone FIG. 3 provides a diagram of an embodiment of paired waypoint zones.

FIG. 2 provides an example of a short-range north-facing corridor timing zone (201) which is located on Grand Avenue in Saint Louis, Missouri. While the corridor timing zone (201) is shown as a traditional rectangular zone as this corresponds to this section of route, it should be recognized that this is not required an alternative shapes, such as alternative polygons, can be used in alternative embodiments. This section of Grand Avenue can be subject to severe traffic backup. Even while this corridor timing zone (201) is relatively short at a quarter-mile in length, it includes five traffic control signals. One of those signals is also connected to a pedestrian demand crosswalk which connects two parts of Saint Louis University and is subject to large amounts of pedestrian traffic.

For purposes of this example, the Pacing Zone Parameter is set to be 150 seconds which also takes into account that the zone (201) includes a bus stop located on the University campus which is usually quite busy that the mass transit vehicle is intended to stop at. The mass transit vehicle (a bus) enters the corridor pacing zone (201) from the Forest Park side (203) at the bottom of the map, travels North, and exits on the Lindell Boulevard side (205) at the top of the map. Upon exit from the corridor pacing zone (201), the VCU (101) computes the duration of time it was within the zone (201). If the total time exceeds the 150 second timing parameter, the bus temporarily enables the VCU (110) to indicate that the bus is entitled to priority as a result of the higher-than-normal transit time through the corridor.

The next detection zone (215), extending from Lindell Boulevard to the next location would therefore respond in a fashion to grant the bus priority. At some point, the bus will enter another corridor timing zone (not shown) where a "normal" transit time is known. It can be the detection zone (215) but if in this zone priority is expected to be granted, this will often not be the case. However, in that next corridor pacing zone, transit through that zone can be evaluated, and if the transit time is below the parameter the traffic issue is presumed to have been cleared and the VCU (101) will turn off resulting in transit signal priority being temporarily disabled until the next corridor timing zone. The process repeats from one corridor timing zone to the next corridor timing zone, continually evaluating the vehicle's travel time against an "ideal" or "average" travel time for each corridor.

It should be apparent that this form of corridor timing zone (201) is necessarily imperfect as it is possible for a vehicle to be loosing time in a slow zone getting priority and then losing priority before the time is made up as the vehicle can pass through the zone where they have priority particularly quickly (due to priority) even if they are still snarled in traffic moving with them. However, by having the VCU (101) toggle between requesting priority (enable) and not doing so (disable) and by doing so always with the delay of at least a single zone (that is, the vehicle will always have priority through at least one corridor timing zone once it is granted from being slow in a zone) the vehicle will generally be provided with the ability to recover from a slow segment of travel. Further, the priority indication should allow the vehicle to catch up (or at least not fall further behind). With sufficient corridor timing zones along the predetermined published route of the vehicle, the vehicle will rarely be able to fall substantially behind schedule as such a situation would result in near continuous priority which should serve to accelerate the vehicle through virtually any traffic situation. The vehicle is also unlikely to substantially ahead of schedule as if it is not traveling slow through the corridor timing zone(s) (201) it will not be granted priority at any point and, therefore, should be moving according to the scheduled timing.

A second form of monitoring zone are waypoint pair zones. A waypoint zone generally does not exist alone but there will always be at least two and the various waypoint zones can always be considered as paired with another waypoint zone. Note, however, that the pairs do not need to be exclusive and a single zone may be paired with multiple other zones. The zones are typically placed, in pairs, at two waypoints along the transit vehicle route, which would typically denote busy transit vehicle stops or important locations of interest. The VCU (101) is provided with the parameter which is the expected delay between check-in at the first zone in the waypoint pair and check-in at the second zone in the waypoint pair.

Upon entry of the second waypoint pair zone, the vehicle checks the time elapsed between the first event at the first waypoint pair zone against the second event at the second waypoint pair zone. If the elapsed time is greater than the intended transit time between those two points, once again the VCU is activated into priority mode (turned on or enabled). Alternatively or additionally, instead of using the expected delay (e.g. time of transit between the two zones) the specific arrival time at the second zone may be compared against the scheduled arrival time or against an expected arrival time calculated from the time of departure of the first zone.

Note that there is, of course, a maximum threshold between these two check-in locations, such that if the vehicle travels through the stop at the beginning of the day, proceeds on a different transit route, and returns to the second stop later in the day while on another transit route, the vehicle is not authorized even though the maximum time elapsed between the first check-in and the second check-in has been exceeded.

Figure 3:
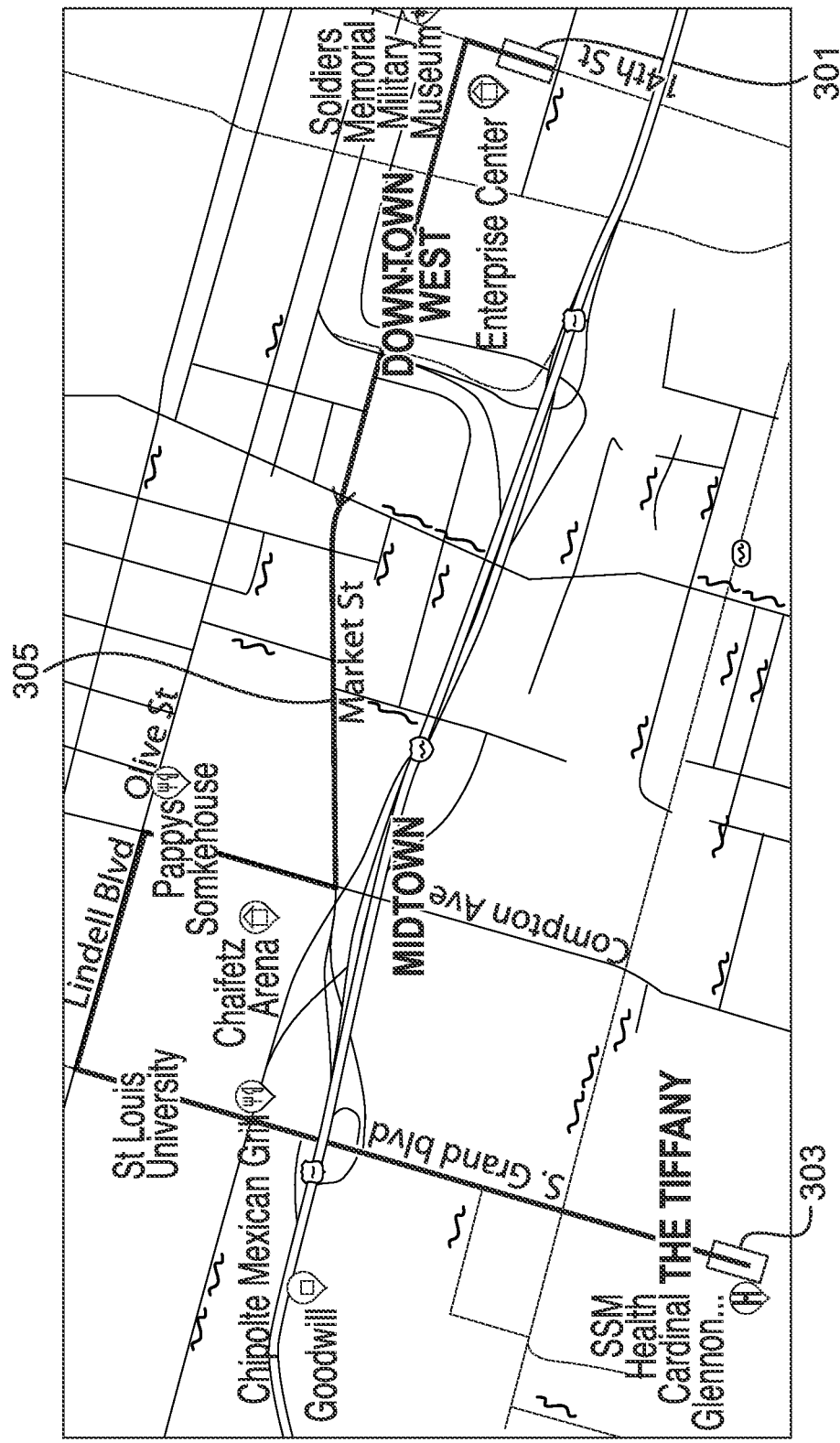

FIG. 3 provides an illustration of two waypoint zones (301) and (303) which have been paired and are associated with a route which connects a sports stadium to a university hospital location. The vehicle, however, does not travel directly between these location but takes a 3.5 mile winding path (305) through the city. This winding path would make the use of a single corridor timing zone over this path less convenient and would require a substantial number of corridor timing zones if one wished to place them along the route to deal with its curves and twists. Instead, a "check in" waypoint (301) is created just north of the sports stadium, and a "check in" waypoint (303) is created just north of the hospital. The VCU upon arriving at the check-in waypoint (303) that is second in the pair, checks the last check-in at the zone (301) that is first in the pair. If the time between the two check-ins is between the maximum transit time parameter (which in this case would denote the typical 20-minute transit time between the two locations) and the maximum threshold, the vehicle self-issues the activation command so that it can expedite its trip through the next set of intersections, allowing the bus to return to schedule.

In addition to the logic provided through the use of the corridor timing zones (201) and the waypoint timing pair zones (301) and (303), additional functionality and flexibility can be afforded through the application of zone time intervals to either or both those types of zones. Any detection zone created in the system may have a zone time interval applied to it, which limits the time of day or day of the week where the detection zone is included in the zone-activation routine. Typically, this feature is used to create shorter-range zones on the approach to an intersection which apply during congested hours of the day, where allowing priority to be obtained might have an adverse effect on already-congested traffic flow, while longer zones are created which apply during non-peak times and overnight, which give transit vehicles longer and better right-of-way during times where disruption to the flow of traffic is lessened.

A corridor timing zone (201), for example, can be created and configured with an expected transit time of five minutes (300 seconds) from one bus stop to another during the early morning hours on Saturdays and Sundays. Another corridor timing zone can be created in the same physical location on the map as the first corridor timing zone (201), but configured with a different expected transit time (let's say ten minutes, or 600 seconds, for example) during the early morning hours of Monday through Friday, corresponding to the increase in traffic congestion during the rush to work and potentially increased stop times due to increased ridership.

Note also that the corridor timing zone (201) which is configured with a transit time of five minutes can have multiple zone time intervals applied to it, such as 2 am-to-10 am and 2 pm to 10 pm on Saturday and Sunday, as well as 10 pm-to-2 am every day of the week. Multiple corridor timing zones may be overlaid on top of one another, so long as they are active at different times of the day or different days of the week.

Applied zone time intervals enable the corridor timing zone(s) to reflect the expected transit time from one side of the corridor to another, or from Point A to Point B, as is expected based on the congestion conditions that change throughout the day or from day to day. This prevents the VCU (101) from constantly requesting priority from the wayside equipment in times where congestion is significant enough that priority is more of a hindrance to traffic flow than a help, such as times of peak traffic at the beginning, middle, and end of work days. This allows the operator to customize the level of influence that transit vehicles have on the traffic around them, based on historical expectation of traffic flow in various areas throughout the municipality (whether in suburban sprawl, industrial district, or in tight downtown environments) under different traffic load conditions.

Still further, the time determination of expected transit can also be altered depending on if the mass transit vehicle is currently ahead of, on, or behind schedule and what state a change would shift to. For example, if a bus was ahead of schedule, the allowed transit time in a particular zone may be increased and even if it is missed, the vehicle may simply deemed to now to be on schedule instead of behind schedule. The window could also be determined incrementally. For example, if a bus was determined to be 3 minutes ahead of schedule, 180 seconds (or even something like 240 seconds to keep the bus from staying ahead of schedule) could be added to the current allowed zone interval before the bus was considered to no longer be on schedule. However, if the bus took sufficiently longer than expected (for example if the buys was 180 seconds fast, but took 600 extra seconds in a zone), a bus which was considered ahead of schedule could now be considered behind schedule and granted priority.

While the above provides for two examples of zones whereby the vehicle will either activate or deactivate the priority request function of the VCU (101) based on the vehicle performance through the zones, this is not the only type of zone which may be used to activate or deactivate the priority function of the VCU (101). In addition or alternatively to the above, specific zones may be provided where the priority function is activated or deactivated regardless of the vehicles actual performance in a zone up until that time.

As indicated above, these additional zones are of two general types. Authorization enable zones are zones which are placed in any location where, when the vehicle enters the zone, it is desirable for the vehicle to enable VCU (101) to turn on ("enable") and indicate that priority is required. This is equivalent to the bus being behind schedule, but the zone makes no determination as to actual schedule.

The other type is the authorization disable zone which is effectively the opposite of the authorization enable zone and is placed in any location where, when the vehicle enters the zone, it is desirable for the vehicle to turn off the VCU (101) ("disable"). This is equivalent to the bus being on or ahead of schedule which would disable transit signal priority.

Much like the various different timing zones, it may be desirable at certain times of the day or on certain days of the week to selectively enable or disable the ability to make priority calls at certain locations.

For example, it may be prudent to have vehicles which are returning from the transit route during busy work-day hours pass through a zone which disables the VCU (101) regardless of whether they were ahead, on, or behind schedule on the previous route segment. With the vehicle VCU (101) disabled, it can travel through the next series of intersections on the same timing as passenger vehicles around them and as it has no need to remain on a schedule (since it is out of service), but the system can monitor the corridor timing zones to see if the vehicle is being delayed by the traffic conditions at the present time on the new route. This effectively allows the user to "reset" the various timing zones' influence on the operation of the system as the vehicle moves from one corridor to another. Additionally, it may only be necessary to perform this operation during the work-week, and instead allow the conditions from one route to another influence one another during the lighter traffic experienced in a location during the weekend.

Conversely, there may be locations where it is necessary, only at certain times of the day or on certain days of the week, to force the VCU (101) into the enabled state in order to aid in clearing traffic in a specific direction at a specific intersection which might encounter higher-than-normal congestion in a specific approach, but wouldn't otherwise be triggered by a delay. In this application, the transit vehicles are able to assist in extending green phases or shortening red phases in locations where traffic builds up in a certain direction only at specific times of the day or on specific days of the week. Such operation could also be used as part of a general traffic management scheme to utilize mass transit vehicles to help clear areas where gridlock is common.

Just like with the various timing zones, these authorization disable zones and authorization enable zones can have more than one zone time interval applied to them.

The next section of this document outlines using data available in the General Transit Feed Specification (GTFS) or other route and stop information systems for the purpose of enhancing the capabilities and usage of the VCU when it is applied to transit operations.

In mass transit operations many transit systems provide their routes and stop locations to the public in the form of a transit feed such as a GTFS static feed, which contains a complete repository of all the relevant information to the operation of the transit agency. From this data, it is possible to pull the locations of stops for vehicles assigned to various routes. This data can be pulled and analyzed both by central server based TSP systems as well as by VCUs (101) themselves (or their accessory programmable control heads).

Figure 4:
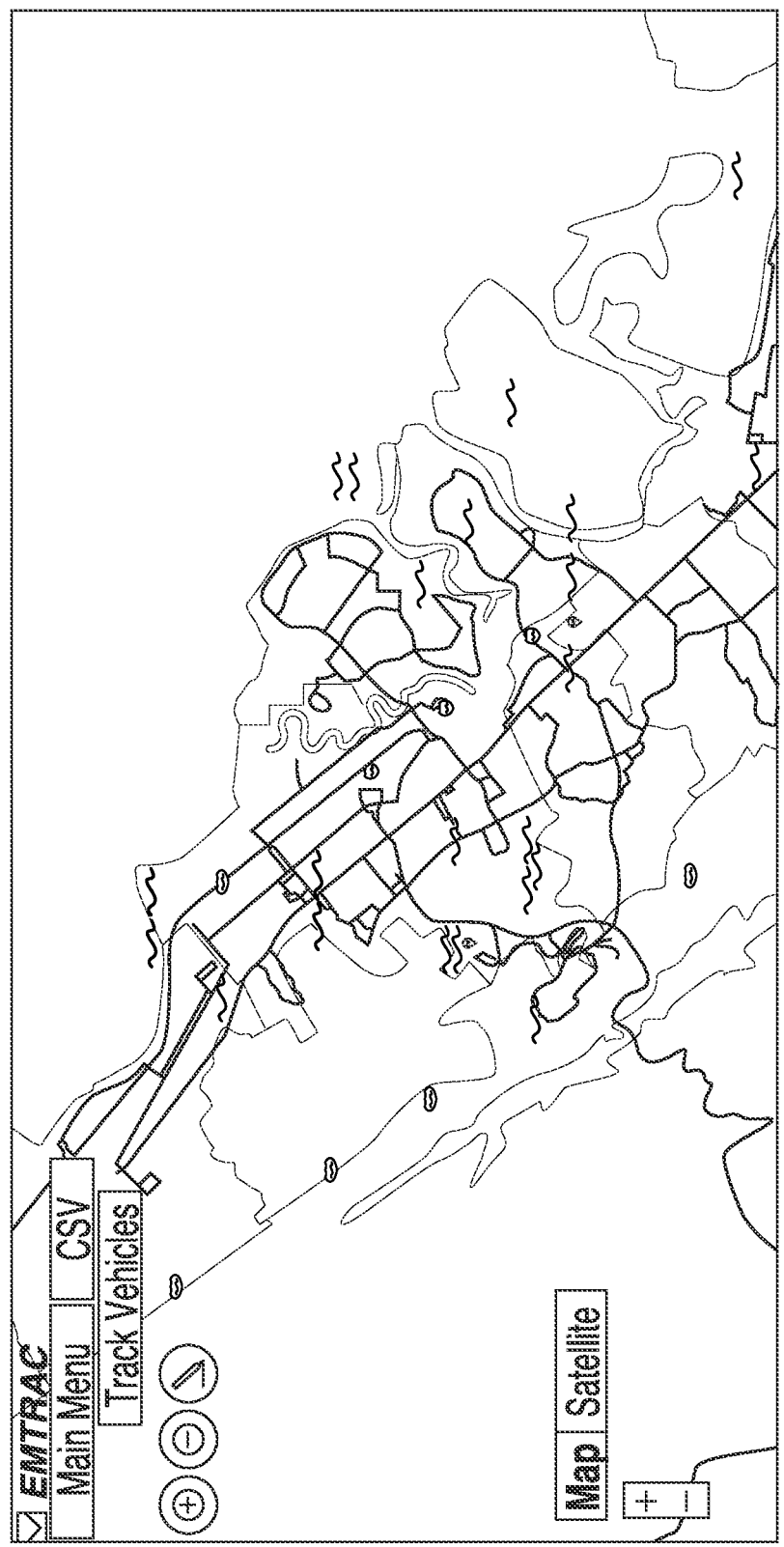
FIGS. 4 and 5 provide diagrams of embodiments utilizing General Transit Feed Specification (GTFS) information.

FIG. 4 provides an example of a transit agency's bus routes, as pulled directly from their published static GTFS feed. In this scenario, where the selectively-activated priority request is desired but the VCU (101) does not have schedule adherence equipment, the system can run an additional schedule adherence routine in addition to the normal priority routine. In this methodology, a map of virtual detection zones is created on the approaches to intersections where transit vehicles may request for priority, just as with any other VCU (101) system. However, instead of the VCUs (101) then simply running the route and comparing their location to their database of detection zones, the VCUs (101) are kept in a disable state until they are self-authorized by a schedule adherence routine.

During the vehicle startup process at the beginning of the working shift, the VCU (101) may utilize a connection to the vehicle's onboard Wi-Fi provider to reach out to the Internet and acquire the appropriate static GTFS information. If the customer declines to provide a network connection to the system hardware, then the VCU (101) will generally need to be equipped with its own Cellular capabilities to be able to reach the internet and acquire this information. The VCU (101) typically first determines if the static GTFS information has been updated since the last download, and if it has been, it acquires the newest version.

Since the GTFS static information includes the location of the bus stops and the times that the buses should arrive at them, depending on their assigned route and slot, this information can be valuable to the schedule adherence routine. The vehicle typically acquires the GTFS real-time information via the same method, though this information is constantly updated, so it typically needs to be downloaded in real-time or near real-time. The GTFS real-time feed generally includes the position of the vehicle, as well as the trip updates which help correlate the vehicle ID to the route and slot that the vehicle has been assigned to. Knowing the vehicle's route and slot, it can then select the relevant times that the bus should "check in" at the various stops to be considered on time.

Figure 5:
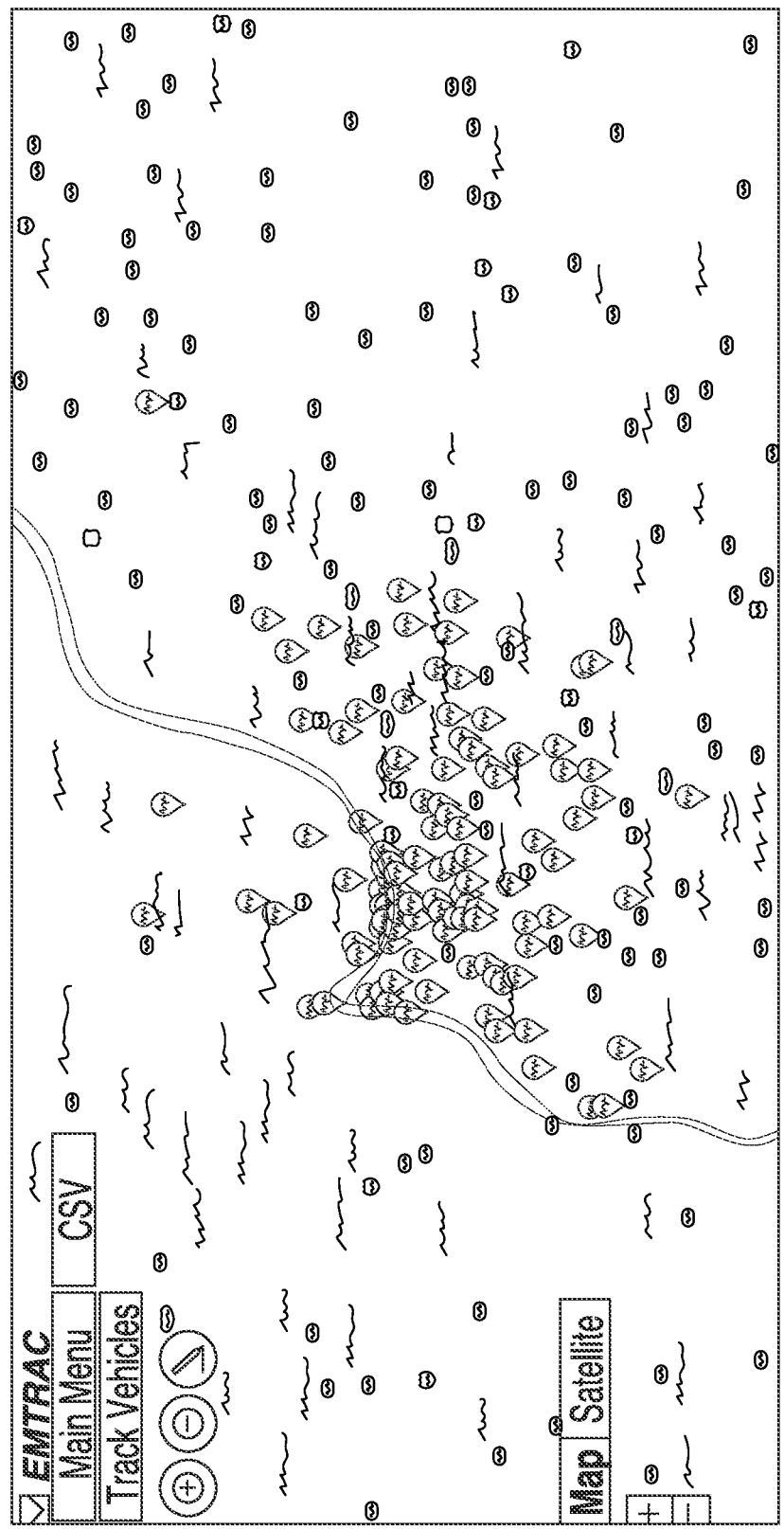

FIG. 5 provides an example of a transit agency's bus positions displayed in real-time, pulled directly from the real-time GTFS feed. The VCU (101) will generally continually process the vehicle's current location as acquired from its own GPS/GNSS module (or relies on the position relayed in the GTFS Real-Time feed in the event of a GPS antenna failure), and compare its arrival time at each bus stop to the arrival time dictated in the GTFS Static feed for that route and slot. If the bus has arrived at the station behind schedule, and in a number of seconds exceeding the schedule deviation threshold (for example, five minutes behind schedule), then the VCU (101) self-issues an external authorization (enable) command which enables the VCU (101) to request priority at the next intersection(s). The VCU (101) then performs its normal routine of comparing its position to its virtual detection zones, sending to request priority through the intersection until it reaches the next bus stop.

When the VCU (101) arrives at the next bus stop, the schedule adherence routine again performs the comparison to the schedule and determines if the bus is back on schedule or even ahead of schedule. When the bus returns to conformance with its stated schedule, the VCU (101) is disabled from continuing to request priority. This process generally repeats at every bus stop until the vehicle ends its service day or changes routes, at which point the VCU (101) may re-examine the static feed data and may update the times that it expects to arrive at the listed bus stop locations.

It is important to note that not all mass transit systems provide their real-time data for use with this method. In the event that the agency is unwilling or unable to provide the real-time data, the system can utilize several other schemes for obtaining the vehicle-route assignments, such as the utilization of a programmable control head in the vehicle's operator area, where the human-machine-interface afforded allows the operator to manually select their route assignment. Alternatively, the dispatcher who assigns vehicles to routes can use central monitor (102) software to remotely assign vehicles to their routes, which is published to a file which the VCU (101) can retrieve when it retrieves the GTFS Static feed data. With these features, the system can overcome the limitations of certain agencies who only provide part of the total GTFS feed.

The above systems and methods allow a VCU (101) to not be required to always request priority at all the equipped intersections along a transit route, which minimizes the adverse impact the mass transit vehicle's use of priority may have on the planned flow of traffic and assists in keeping mass transit vehicles closer to schedule adherence. These systems and methods therefor present solutions to situations where the customer may desire this functionality even in the absence of an interface to existing Scheduling equipment or to the traffic network.

The qualifier "generally," and similar qualifiers as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method for assisting in maintaining a vehicle on a fixed schedule, the method comprising;
    providing a vehicle having a schedule and a route and carrying a Vehicle Control Unit (VCU) which lacks the capability of calculating and determining whether or not the vehicle is on schedule;
    obtaining a scheduled arrival time for said vehicle to arrive at a specified stop on said route from General Transit Feed Specification (GTFS) information; and
    a schedule adherence routine comparing an actual time said vehicle arrives at said specified stop to said scheduled arrival time at said specified stop;
    wherein:
    if said comparison determines said actual time is after said scheduled arrival time by at least a schedule deviation threshold, said schedule adherence routine activates said VCU which requests priority for said vehicle until said vehicle arrives at a next stop; and
    if said comparison determines said actual time is not after said scheduled arrival time by at least a schedule deviation threshold, said schedule adherence routine inactivates said VCU which does not request priority for said vehicle until said vehicle arrives at a next stop;
    activating said VCU when said vehicle enters an authorization enable zone regardless of if said VCU is active or inactive when said vehicle enters said authorization enable zone;
    inactivating said VCU when said vehicle enters an authorization disable zone regardless of if said VCU is active or inactive when said vehicle enters said authorization disable zone.

2. The method of claim 1 wherein in said authorization disable zone is not on said route.

3. The method of claim 1 wherein said authorization disable zone is on said route.

4. The method of claim 1 wherein said vehicle is a mass transit vehicle.

5. A method for assisting in maintaining a vehicle on a fixed schedule, the method comprising;
    providing a vehicle having a schedule and a route and carrying a Vehicle Control Unit (VCU) which lacks the capability of calculating and determining whether or not the vehicle is on schedule;
    obtaining a scheduled arrival time for said vehicle to arrive at a specified stop on said route from General Transit Feed Specification (GTFS) information;
    a schedule adherence routine comparing an actual time said vehicle arrives at said specified stop to said scheduled arrival time at said specified stop;
    wherein:
    if said comparison determines said actual time is after said scheduled arrival time by at least a schedule deviation threshold, said schedule adherence routine activates said VCU; and
    if said comparison determines said actual time is not after said scheduled arrival time by at least a schedule deviation threshold, said schedule adherence routine inactivates said VCU;
    waiting for said vehicle to arrive at said next specified stop; and
    comparing an actual time said vehicle arrives at said next specified stop to a scheduled arrival time at said next specified stop, said comparison determining if said VCU remains active or is inactive after said next specified stop;
    wherein:
    if said comparison determines said actual time is after said scheduled arrival time by at least a schedule deviation threshold, said VCU is made active; and
    if said comparison determines said actual time is not after said scheduled arrival time by at least a schedule deviation threshold, said VCU is not altered from if it is currently active or inactive;
    activating said VCU when said vehicle enters an authorization enable zone regardless of if said VCU is active or inactive when said vehicle enters said authorization enable zone.

6. The method of claim 5 further comprising:
    inactivating said VCU when said vehicle enters an authorization disable zone regardless of if said VCU is active or inactive when said vehicle enters said authorization disable zone.

7. The method of claim 6 wherein in said authorization disable zone is not on said route.

8. The method of claim 6 wherein said authorization disable zone is on said route.

9. The method of claim 5 wherein said vehicle is a mass transit vehicle.

10. A method for assisting in maintaining a vehicle on a fixed schedule, the method comprising; providing a vehicle having a schedule and a route and carrying a Vehicle Control Unit (VCU) which lacks the capability of calculating and determining whether or not the vehicle is on schedule; obtaining a scheduled arrival time for said vehicle to arrive at a specified stop on said route from General Transit Feed Specification (GTFS) information; a schedule adherence routine comparing an actual time said vehicle arrives at said specified stop to said scheduled arrival time at said specified stop; wherein: if said comparison determines said actual time is before said scheduled arrival time by at least a schedule deviation threshold, said schedule adherence routine inactivates said VCU; and if said comparison determines said actual time is not before said scheduled arrival time by at least a schedule deviation threshold, said schedule adherence routine activates said VCU; waiting for said vehicle to arrive at said next specified stop; and comparing an actual time said vehicle arrives at said next specified stop to a scheduled arrival time at said next specified stop, said comparison determining if said VCU remains active or is inactive after said next specified stop; wherein: if said comparison determines said actual time is before said scheduled arrival time by at least a schedule deviation threshold, said VCU is made inactive; and if said comparison determines said actual time is not before said scheduled arrival time by at least a schedule deviation threshold, said VCU is not altered from if it is currently active or inactive; activating said VCU when said vehicle enters an authorization enable zone regardless of if said VCU is active or inactive when said vehicle enters said authorization enable zone.

11. The method of claim 10 further comprising:
inactivating said VCU when said vehicle enters an authorization disable zone regardless of if said VCU is active or inactive when said vehicle enters said authorization disable zone.

\* \* \* \* \*